Aug. 9, 1966  P. H. HOFER  3,265,789
METHOD AND APPARATUS FOR FORMING THERMOPLASTIC FILMS
Filed Nov. 30, 1960  2 Sheets-Sheet 1

INVENTOR.
PETER H. HOFER
BY
Walter C. Kehm
ATTORNEY

Aug. 9, 1966   P. H. HOFER   3,265,789
METHOD AND APPARATUS FOR FORMING THERMOPLASTIC FILMS
Filed Nov. 30, 1960   2 Sheets-Sheet 2

INVENTOR.
PETER H. HOFER

BY
*Walter C. Kehm*
ATTORNEY

United States Patent Office 3,265,789
Patented August 9, 1966

3,265,789
METHOD AND APPARATUS FOR FORMING THERMOPLASTIC FILMS
Peter H. Hofer, Berkeley Heights, N.J., assignor to Union Carbide Corporation, a corporation of New York
Filed Nov. 30, 1960, Ser. No. 72,639
9 Claims. (Cl. 264—95)

This invention relates to improvements in method and apparatus for forming thermoplastic films by extrusion techniques and more particularly to improvements in method and apparatus for forming thermoplastic films which are to be wound on rolls subsequent to extrusion.

Presently known methods for extrusion forming of thermoplastic films extrude molten thermoplastic through a slit or annular die orifice, cool the extruded film and wind the cooled film on a roll. These methods have in common the problem of local variations in film gauge, either ridges or valleys due to a die orifice imperfection, uneven plastic flow to the die orifice or nonuniform handling of the film after emergence from the die. Even very slight thickness variations, e.g., 0.00001 inch, cause either soft or hard ridges or valleys depending respectively on whether the variation is to a greater or lesser gauge than the standard gauge.

As the film is rolled on a wind-up roll, these ridges and valleys are superposed with each successive turn of the roll. After several hundred turns or more the distortion is great enough to permanently emboss the film. Upon unwinding this embossing appears as a highly undesirable continuous belly in the film.

It is an object, therefore, of the present invention to provide improvements in presently known extrusion film-forming methods and apparatus whereby wound thermoplastic film is unaffected by local variations in the film gauge.

The above and other objects of the present invention are accomplished, in general, by adding to conventional thermoplastic film extrusion methods during the cooling of the extruded film and prior to winding on a roll, the step comprising selectively increasing the film thickness by impinging a column of cooling fluid in a substantially continuous traversing pattern on selected narrow areas of said film surface.

Apparatus is also provided comprising one or more conduits, positioned between the film forming orifice and the film windup assembly. These conduits are adapted to impinge a column of cooling fluid on a surface of the film in a substantially continuous traversing pattern.

The invention will be more fully described hereinbelow in conjunction with the attached drawings wherein.

Figure 1:
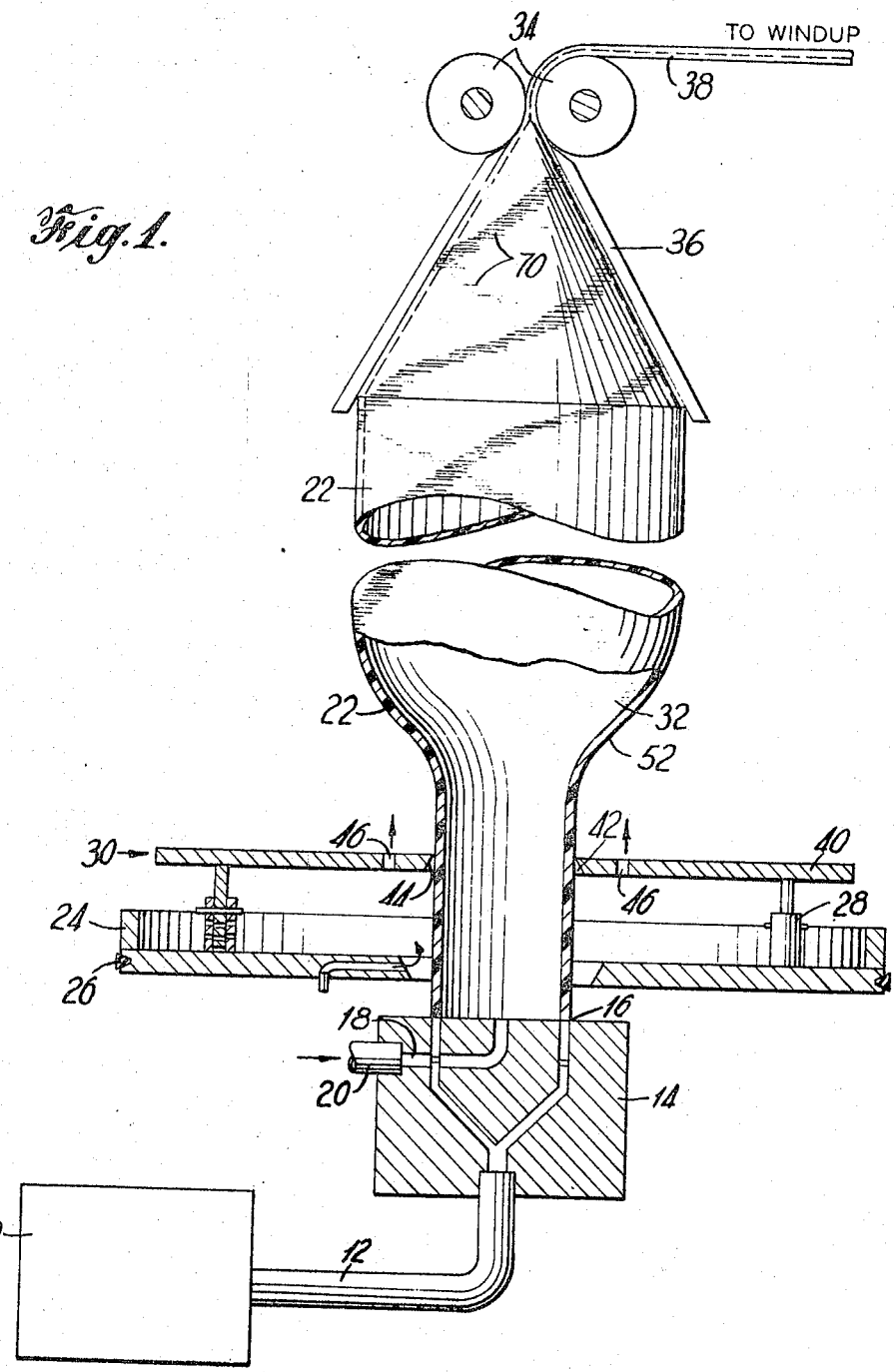
FIG. 1 is a partly diagrammatic sectional view of a tubular film extrusion apparatus modified with an embodiment of the improvement of this invention.

Referring now to the drawings in detail, where like numerals indicate like parts there is shown in FIG. 1 an apparatus for extruding tubular film comprising an extruder 10 which advances molten thermoplastic through elbow 12 to an upwardly extruding bottom fed die 14 having an annular orifice 16 and provided with a central air passage 18 leading from port 20 for the introduction of gas into the extruded tubing 22 formed by the die orifice 16.

The tubing 22 is drawn from the die orifice 16 and immediately cooled to a temperature at which it is substantially self-sustaining and able to retain gaseous fluid. Cooling is accomplished by means of air or gas directed at the tubing periphery from air ring 24. The air ring 24 is mounted for rotation to insure circumferential cooling of the tubing 22 and is driven by means of a belt 26 and a motor (not shown).

Spaced above the air ring 24 suitably mounted on adjustable supports 28 extending from rotary air ring 24 is a fluid directing device generally indicated at 30 and more fully described hereinbelow. Above the directing device 30 the tubing 22 is laterally expanded by being drawn over a bubble of trapped gas, generally indicated at 32; and longitudinally stretched by being drawn from the die orifice 16 by nip rolls 34. Alternatively, the central opening 42 in the fluid directing device 30 can be widened considerably to provide for tubing expansion immediately upon emergence from the die. A standard collapsing frame 36 smoothes the film as the tubing diameter is reduced and the tubing finally flattened. The collapsed, flattened tubing 38 is drawn from the nip rolls 34 to a wind-up assembly consisting of a driven wind-up roll (not shown).

The fluid directing device 30 in this embodiment comprises a relatively flat, rigid plate 40 suitably fabricated of wood, heat resistant plastic or metal and preferably the last, especially steel. The plate 40 is provided with central opening 42 having a wall 44 which can bear against the tubing 22 to maintain the tubing 22 between the die orifice 16 and the plate 40 substantially cylindrical and yet not tear the tubing as it moves therepast.

Figure 2:
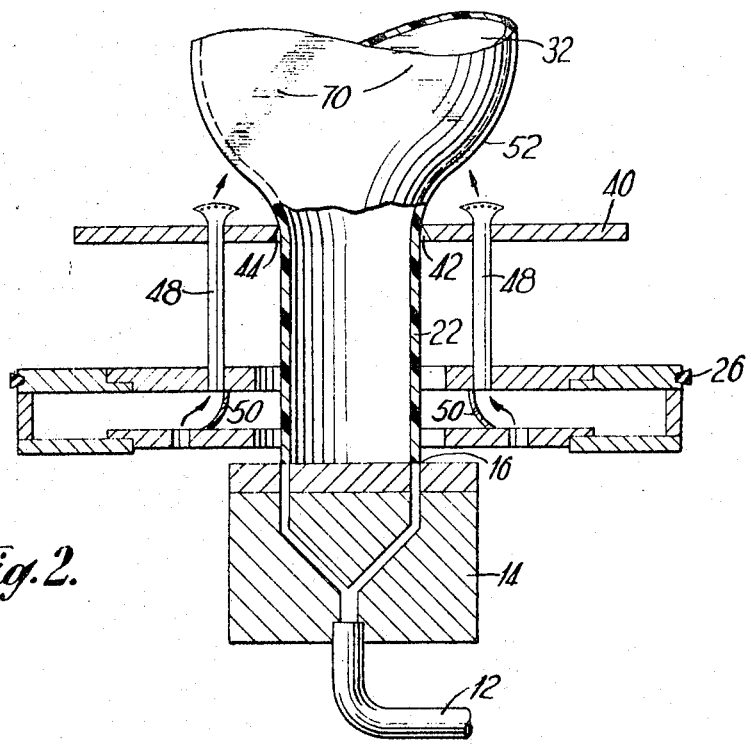
FIG. 2 is a sectional view of another embodiment of the improvement of this invention in a tubular film extrusion apparatus.

Also provided in plate 40 are one or more (X) conduits, suitably channels 46 spaced radially and equidistantly from the central opening 42 and 360°/X from one another. The channels 46 are illustrative only of suitable conduits for conducting cooling fluid from below plate 40 and directing the fluid toward the tubing above plate 40. Other types of conduits include ducts 48 shown in FIG. 2. Whatever the specific design, each conduit has the function of shaping the cooling fluid whether air, gas or water or other liquid into a column and directing it toward the film surface while the fluid is at a temperature below the surface temperature of the film at the point of impingement. In this embodiment cooling gaseous fluid enters the conduit either because of the pressure differential existing above and below plate 40 in FIG. 1 or because guided as by vanes 50 in FIG. 2. The cross-sectional area of the conduits is usually circular but can be of any shape which allows free passage of fluid therethrough with sufficient velocity to reach the tubing 22.

The conduits 48 can be mounted independently of the air ring 24 and, for example, move in an arc around the tubing, e.g., an arc of 90° or 180° C. Cooling fluid can be supplied by pumps, compressed gas bottles, blowers and similar apparatus.

The column of cooling fluid impinges on the wall 52 of tubing 22. Thus, certain areas of the film are force-cooled, i.e., with the stream or column of fluid while the remainder of the tubing wall 52 is only generally cooled by the ambient atmosphere or the normal cooling ring orifices. The result is "selective" cooling of only narrow, contiguous portions of the tubing wall by each of the columns of cooling fluid. Selective cooling causes a controlled inequality in cooling and solidification of the tube wall 52. The more rapidly cooled areas cool less readily and, hence, are increased in thickness over the remainder of the tube wall. Because the fluid directing device rotates the columns of cooling fluid, as they traverse the tube wall, the force-cooled portion of the film describes one or more spirals on the tubing 22.

Figure 3:
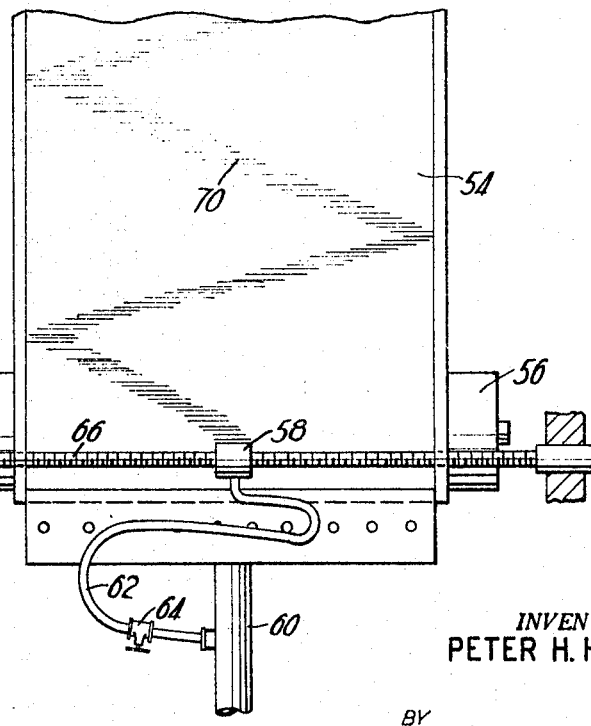
FIG. 3 is a plan view of a flat film extrusion apparatus provided with another embodiment of this invention.

A flat film extrusion embodiment of the present invention is shown in FIG. 3. Therein molten thermoplastic film 54 is extruded and drawn away from a die slot (not shown) and while supported, as by roll 56, is traversed with a column of cooling fluid from a fluid directing device comprising a conduit 58 supplied with fluid from pipe 60 and flexible tubing 62 through valve 64. The conduit 58 is movably mounted for reciprocal lateral motion on threaded rotating shaft 66 driven by motor 88.

In general, the method of this invention is carried out by extruding thermoplastic film either as flat film or as tubing, immediately cooling the film to lower the temperature to a level where the film is self-supporting by blowing air, water or other cooling liquid or gaseous fluid, suitably at a temperature below the impinged area of film and preferably at room temperature or chilled to below room temperature against the hot tubing or flat film, and simultaneously or subsequently impinging on selected narrow areas of the film a column of cooling fluid in a continuous traversing pattern and thereafter winding the film on a roll.

Except for the obvious equipment differences described above, flat film is treated the same as tubular film. Tubing is passed through an air ring and immediately, or after maintenance substantially unexpanded for a space, is passed over a trapped bubble of gas and is stretched laterally while simultaneously being stretched longitudinally by the drawing force of the nip rolls. Columns of fluid from the air ring or other source impinge on portions of the tubing wall, and cool these portions of the tubing more rapidly than the surrounding tubing is being cooled. As the tubing moves away from the die, each column of cooling fluid traces a line across the tubing wall. Because the secondary die is rotating relative to the tubing, the columns of cooling fluid form bands winding around the tubing. These bands are harder and less stretchable than the remainder of the tubing as stated above and, hence, as stretching is accomplished they do not stretch or thin out as much as surrounding portions. The result is a ridge of slightly thicker thermoplastic, a "bead" of increased film thickness indicated at 70 in the drawings across the surface of the film.

Because the bead 70 is substantially continuous, i.e., terminates only possibly at the edge of flat film before retracing its path and traverses a portion of the entire film surface in a uniform manner, it enables a winding of the film without distortion from a local ridge or valley in a particular turn on the wind-up roll. Where there is a local variation in the path of the cooling fluid the bead is not linearly increased or decreased. Rather, because the cooling rate of the film is essentially a function of the square of the thickness, the effect of local variations on the bead is negligibly slight. By using the above described method, rolls of film free of embossings and bellies or furrows are obtained.

The number and spacing of the columns of cooling fluid is not critical in the present invention. Generally one column for flat film extrusion and two spaced 180° apart for tubular film extrusion are preferred. An arrangement which provides a highly desirable symmetrical bead is one where an even number, e.g., two to six cooling fluid columns are used, preferably spaced equidistantly.

Factors such as extrudate temperature, extrusion rate, film cooling rate, bubble diameter or roll temperature will vary with particular thermoplastics and end product requirements. Dependent on these factors will be cooling air velocity and temperature, and the size, shape and distance from the die of the fluid directing means. Width and thickness of the bead can be widely varied by either increasing or decreasing distance and temperature of the column of cooling fluid.

What is claimed is:

1. In a method for forming thermoplastic film comprising extruding molten thermoplastic from a film-forming die, generally cooling the entire film surface and winding the cooled film on a roll, the improvement which comprises effecting simultaneously with the general cooling of the entire film surface a selective increase in the thickness of a narrow contiguous portion of a surface of the film by impinging from one to six narrow columns of cooling fluid in a substantially continuous traversing pattern on selected narrow contiguous portions of said film surface, the greatest cross-sectional dimension of said columns being substantially less than the distance between adjacent columns.

2. In a method for forming thermoplastic film comprising extruding molten thermoplastic as tubing from a film forming annular die, generally cooling the entire film surface, expanding the film in the lateral and transverse direction and winding the cooled film on a roll, the improvement which comprises effecting simultaneously with the general cooling of the entire film surface of the tubing a selective increase in the thickness of a narrow contiguous portion of one surface of the film by impinging from one to six narrow columns of cooling fluid in a substantially continuous traversing pattern on selected narrow contiguous portions of said film surface, the greatest cross-sectional dimension of said columns being substantially less than the distance between adjacent columns.

3. The method claimed in claim 2 wherein the cooling fluid is air and is directed by rotating conduits.

4. In a method for forming thermoplastic film comprising extruding thermoplastic as a flat film from a film forming die, generally cooling the film surface and winding the cooled film on a roll, the improvement which comprises effecting simultaneously with the general cooling of the surface of the flat film a selective increase in the thickness of a narrow contiguous portion of one surface of the film by impinging a narrow column of cooling fluid in a substantially continuous traversing pattern on selected narrow contiguous portions of said film surface.

5. In apparatus for forming thermoplastic film comprising a film forming die, cooling means and a film wind-up assembly, the improvement which comprises from one to six movable conduits positioned between the extrusion means and the wind-up assembly, said conduit having means to impinge a column of cooling fluid on a surface of the film emerging from the die in a substantially continuous traversing pattern the greatest cross-sectional dimension of the orifices of said conduits being substantially less than the distance between adjacent conduits.

6. In apparatus for forming thermoplastic film comprising a film forming annular die, cooling means and film wind-up assembly, the improvement which comprises from one to six movable conduits positioned between the extrusion means and the wind-up assembly, said conduit having means to impinge a column of cooling fluid on a surface of the film emerging from the die in a substantially continuous traversing pattern the greatest cross-sectional dimension of the orifices of said conduits being substantially less than the distance between adjacent conduits.

7. In apparatus for forming thermoplastic film comprising a flat film forming die, cooling means and a film wind-up assembly, the improvement which comprises a movable conduit positioned between the extrusion means and the wind-up assembly, said conduit having means to impinge a narrow column of cooling fluid on a surface of the film emerging from the die in a substantially continuous traversing pattern.

8. The apparatus claimed in claim 5 wherein the cooling fluid is directed against the tubing by conduits mounted on a rotating air ring.

9. The apparatus claimed in claim 5 wherein the orifices of said conduits are fan-shaped vanes.

References Cited by the Examiner

UNITED STATES PATENTS

| | | | |
|---|---|---|---|
| 2,632,206 | 3/1953 | Pierce | 264—95 |
| 2,770,009 | 11/1956 | Rogal et al. | 18—14 |
| 2,844,846 | 7/1958 | Kronholm | 18—14 |
| 2,926,384 | 3/1960 | Hertz et al. | 18—14 |

ROBERT F. WHITE, *Primary Examiner.*

WILLIAM STEPHENSON, *Examiner.*

S. NEIMARK, L. S. SQUIRES, *Assistant Examiners.*